United States Patent [19]

Upp

[11] Patent Number: 5,191,582
[45] Date of Patent: Mar. 2, 1993

[54] METHOD AND APPARATUS FOR THE HIGH SPEED MODIFICATION OF A PACKET ADDRESS FIELD OF A TRANSMITTED PACKET IN A FRAME RELAY SYSTEM

[75] Inventor: Daniel C. Upp, Southbury, Conn.

[73] Assignee: TranSwitch Corporation, Shelton, Conn.

[21] Appl. No.: 744,894

[22] Filed: Aug. 14, 1991

[51] Int. Cl.$^5$ .......................... H04J 3/24; H04L 12/56
[52] U.S. Cl. ..................................... 370/94.1; 370/60
[58] Field of Search ..................... 370/60, 85.13, 85.14, 370/82, 84.1, 94.3, 97, 99, 60.1

[56] References Cited

U.S. PATENT DOCUMENTS

| | | | |
|---|---|---|---|
| 4,933,938 | 6/1990 | Sheehy | 370/85.13 |
| 5,038,345 | 8/1991 | Roth | 370/94.1 |
| 5,136,580 | 8/1992 | Videlock et al. | 370/60 |

OTHER PUBLICATIONS

"Frame Relay White Paper" by Brian Button, Broadband '90, 14th Fiber Optic Communication and LAN Exposition, Sep. 24-30, 1990 Baltimore, Md.
"Frame Relay Network-to-Network Interface White Paper" by John Davies and Wai Ho, Frame Relay Forum, Jul. 15, 1991, San Francisco, Calif.
ANSI Standard Ti.6ca "Core Aspects of Frame Protocol for Use With Frame Relay Bearer Service".

Primary Examiner—Benedict V. Safourek
Attorney, Agent, or Firm—David P. Gordon

[57] ABSTRACT

Apparatus and methods for modifying the address field of a packet are disclosed. The apparatus preferably includes an HDLC controller which finds the start of the packet and generates a signal indicative of the same, a sequence controller which receives the signal from the HDLC controller and controls the apparatus in response thereto, an address decoder receives the address field bytes from the HDLC controller and decodes them to provide a DLCI code therefrom, a RAM which is programmed as a DLCI translation table with outgoing DLCI codes being located at addresses which equate to the incoming DLCI codes, an address encoder which receives the outgoing DLCI code from the RAM and generates therefrom outgoing address field bytes, and a FIFO for storing the outgoing address field bytes until output is possible. Bytes received by the HDLC controller during the modification of the packet header are stored by the HDLC controller until the outgoing address field bytes are received at the FIFO. The stored bytes are then also forwarded to the FIFO, and thereafter, incoming data can be forwarded directly to the FIFO. The provided apparatus for modifying the address field of a packet introduces a minimum of delay into the packet transfer and reduces the amount of data storage required to effect the address field modification.

23 Claims, 3 Drawing Sheets

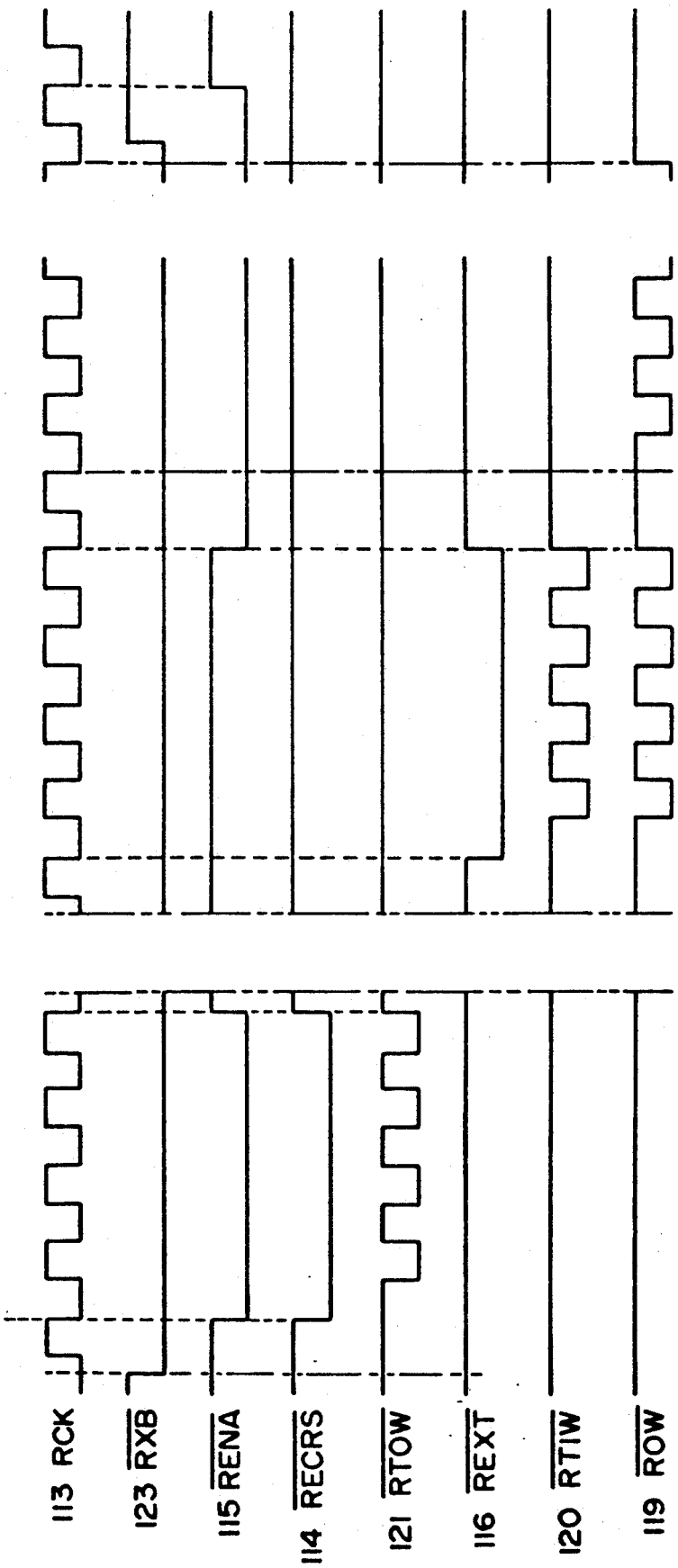

METHOD AND APPARATUS FOR THE HIGH SPEED MODIFICATION OF A PACKET ADDRESS FIELD OF A TRANSMITTED PACKET IN A FRAME RELAY SYSTEM

BACKGROUND

1. Field of the Invention

This invention relates broadly to high speed telecommunication systems. More particularly, this invention relates to apparatus and methods for the modification of the data link channel identifier (DLCI) code which constitutes at least part of the packet address field of a packet in a frame relay system.

2. State of the Art

In packet switching systems, and in frame relay, portions of the packet address field of a transmitted packet received by a switching mechanism (e.g., central office) may need to be modified relay system, the DLCI associated with the incoming packet on its incoming physical link can differ from the DLCI on the outgoing physical link. This is because the number range of the (typically 14-bit) DLCI field of a particular link or group of links is very much smaller than the number of bits (typically 48 or 60) required for the overall directory address. Details of frame relay may be obtained by reference to Button, Brian, "Frame Relay White Paper"; *Broadband '90*, 14th Fiber Optic Communications and LAN Exposition, Sep. 24–30, 1990 (Baltimore, Md); and John Davies and Wai Ho, "Frame Relay Network-to-Network Interface White Paper"; Frame Relay Forum, Jul. 15, 1991 (San Francisco, Calif.).

The frame relay frame structure is set forth in a draft ANSI standard T1.6ca "Core Aspects of Frame Protocol for use with Frame Relay Bearer Service" which is hereby incorporated by reference herein in its entirety. According to the draft standard all frames start and end with a standard HDLC flag sequence (i.e., 1111110). The address field follows after the start flag and is defined in Section 2.3 as consisting of at least two octets (i.e., eight bit bytes), and up to four octets. The address field format is defined in Section 3.2. The first six bits of the first address field octet, and the first four bits of the next address field octet are used as a minimum to provide a ten bit data link connection identification (DLCI) code. Where a third octet is utilized in the address field (and a fourth octet is not used), the first six bits of the third octet are used as part of the DLCI code. However, where the fourth octet is used in the address field, the first seven bits of the third octet, and the first six bits of the fourth octet are used as part of the DLCI code. Thus, either ten, sixteen, or twenty-three bits may be used to comprise the DLCI address. In order to determine whether the frame address field has two, three, or four bytes, the least significant bit of each octet is utilized as an address field extension bit. The presence of a zero in the LSB of any address field octet is used to indicate that the address field contains another octet. Conversely, the presence of a one in the LSB of any address field octet is used to indicate that the address field octet containing the one in the LSB is the final octet of the address field.

Because the DLCI code contained in the address field of the frame must sometimes be changed, a mechanism for making such a change is required. Presently, it is standard to supply a large memory for receiving an entire packet of data. With the entire packet in memory, and with the DLC code contained in known locations, means are provided to overwrite the old DLCI code with a new DLCI code. The packet with the new DLCI code may then be read out from memory and relayed to its appropriate location.

While the standard techniques for modifying the DLCI code work well and are sufficient for many applications, they add significant delay (i.e., at least one frame of delay) to the transfer of data packets, and require large amounts of memory.

SUMMARY OF THE INVENTION

It is therefore an object of the invention to provide a high speed mechanism for modifying DLCI codes of a packet in a frame relay system.

It is a further object of the invention to provide methods and means for packet address modification which require little memory and which accomplish address modification in minimum time.

In accord with the objects of the invention, an apparatus for modifying the address field of a packet comprises an interface means, a sequence controller, first and second memory means, an address decoder, and an address encoder. The interface means is preferably an HDLC controller which finds the start of the packet by finding the first non-flag character, and provides a control signal indicative of the same to the sequence controller. In response to the control signal, the sequence controller controls the apparatus to cause the sending of the address field bytes from the HDLC controller to the address decoder, and then causes the apparatus to effect address modification. In particular, under control of the sequence controller, the address field octets are forwarded to particular registers adjunct to the address decoder, and are decoded (in accord with the draft ANSI standard) by the decoder to provide an address to the first memory means (e.g., a RAM). The first memory means is programmed as a DLCI translation table, with the outgoing DLCI codes being located at addresses which equate to the incoming DLCI codes. Thus, under control of the sequence controller, when the address decoder outputs the DLCI code received in the address field of the packet, that DLCI code is the address in the first memory means which holds the outgoing DLCI code. The outgoing DLCI code is provided by the first memory means to the address encoder which inserts the code into properly formed outgoing octets. The modified address field octets are then forwarded to the second memory means (e.g., a FIFO) for storage until output is possible. Where the second memory means is a FIFO, the controller causes the interface means to store any incoming data during the time that the address field octets are being processed. After the modified address field octets are forwarded to the FIFO, any data stored in the interface means is forwarded to the FIFO, and thereafter, incoming data can be forwarded directly to the FIFO.

The provided apparatus for modifying the address field of a packet introduces a minimum of delay into the packet transfer, as the address field octets are processed directly after they are received. In fact, after the address field octets are accumulated (which may take two, three, or four bytes clock cycles) only about one byte clock is required until the modified address is forwarded for output. In addition, because the processing is so immediate, the amount of storage in the interface means may be kept to a minimum, if desired.

Additional objects and advantages of the invention will become apparent to those skilled in the art upon reference to the detailed description in conjunction with the accompanying drawings.

BRIEF DESCRIPTION OF THE DRAWINGS

FIG. 3 is a timing diagram of the control outputs of the control sequencer of FIG. 2 and the HDLC controller of FIG. 1.

DETAILED DESCRIPTION OF THE PREFERRED EMBODIMENTS

Figure 1:
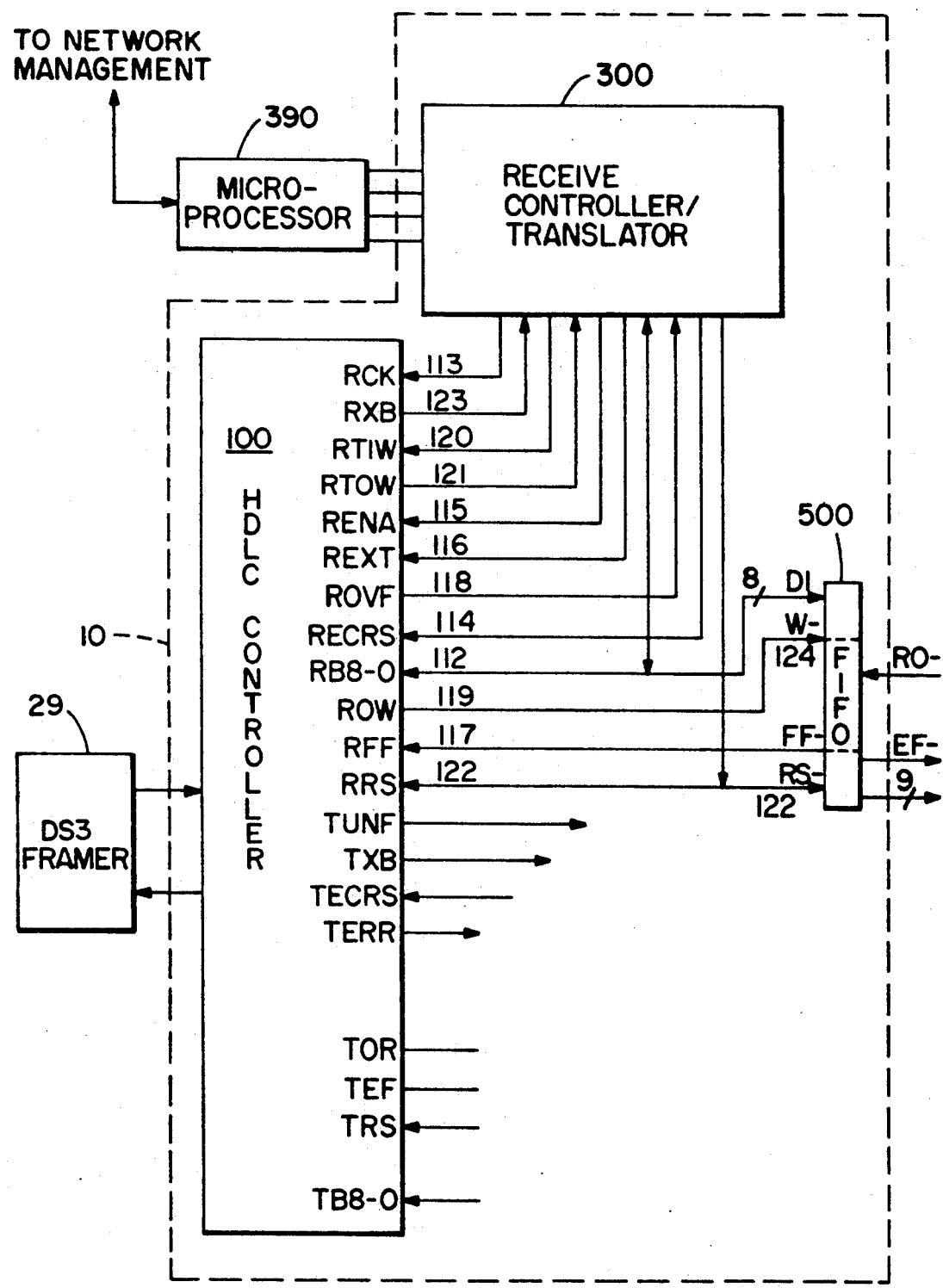
FIG. 1 is a high level block diagram of the preferred apparatus of the invention for modifying the address field of a packet, in conjunction with apparatus with which the apparatus of the invention interfaces.

Turning to FIG. 1, the preferred apparatus 10 of the invention for modifying the address field of a packet is seen and is shown to include an HDLC controller 100, a receive controller/translator 300, and a FIFO 500. As seen in FIG. 1, the HDLC controller 100 interfaces with incoming physical lines via a terminating device 29 such as a DS3 framer which is commercially available from TranSwitch Corp., of Shelton, Conn. Likewise, the receive controller/translator 300 interfaces with a microprocessor 390 which may or may not be local to the apparatus 10 itself. Microprocessor 390, in turn, is coupled to a network management system.

The HDLC controller 100 is essentially an interface logic block which receives packets from the device 29 in HDLC format, and performs such well-known lower-level HDLC functions such as zero deletion, flag detection, and CRC checking In addition and in accord with the invention, the HDLC controller is coupled to the controller/translator 300 and FIFO 500 of the preferred apparatus 10 of the invention via a data bus and various control lines. Based on internal logic and received control signals, the HDLC controller 100 outputs control signals and data onto the control lines and data bus.

The HDLC controller 100 preferably has twelve ports which are coupled to the receive controller/translator 300 or the FIFO 500 (the additional ports being irrelevant to the instant invention). The relevant ports and signal descriptions which utilize those ports are as follows:

RCK: byte clock signal received by HDLC controller 100 from controller/translator 300 via line 113;
RXB: HDLC receive busy indication sent to controller/translator 300 by HDLC controller via line 123;
RTIW: write pulse sent from controller/translator 300 to HDLC controller via line 120;
RTOW: write pulse sent from HDLC controller 100 to controller/translator 300 via line 121;
RENA: HDLC controller output enable control sent by controller/translator 300 to HDLC controller 100 via line 115, which permits HDLC controller 100 to write onto RB8-0 (parallel bus 112);
REXT: Receive controller/translator 300 output enable control which permits controller/translator 300 to write onto bus 112 (RB8-0);
ROVF HDLC controller internal FIFO overflow condition sent to controller/translator 300 by HDLC controller 100 on line 118;
RECRS: Receive error check register reset signal sent from controller/translator 300 to HDLC controller 100 on line 114 for resetting an internal error checking mechanism;
RB8-0 : data bus coupling controller/translator 300 to HDLC controller 100 and FIFO 500;
ROW: write pulse sent from HDLC controller 100 to FIFO 500 over line 119;
RFF: FIFO full signal sent from FIFO 500 to HDLC controller 100 over line 117; and
RRS: Reset signal sent from receive controller/translator 300 to HDLC controller 100 over line 122.

Further details as to the timing of the signals being sent via th various ports to and from the controller/translator 300, and to and from FIFO 500 are set forth hereinafter.

Figure 2:
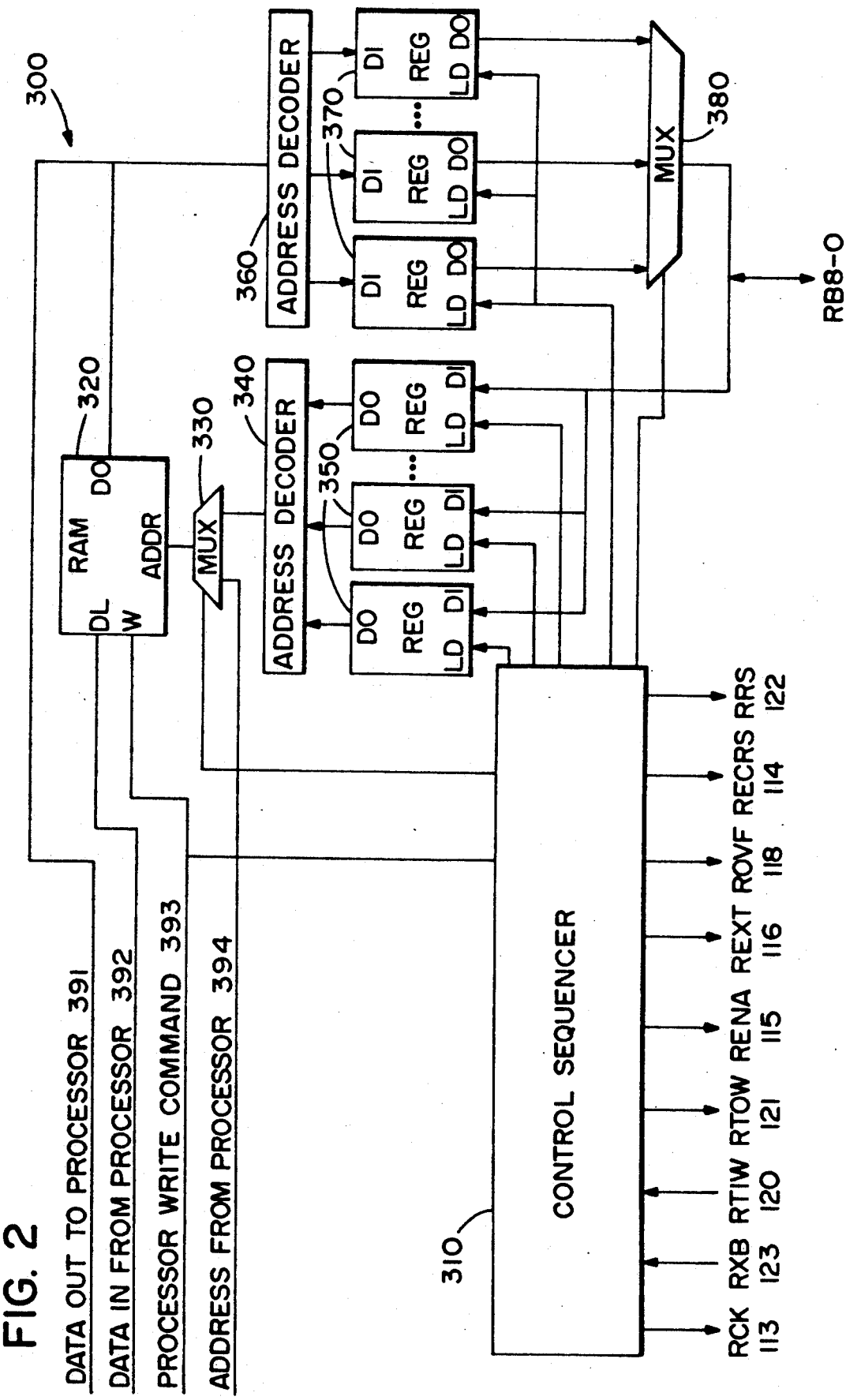
FIG. 2 is a more detailed block diagram of the receive controller/translator block of FIG. 1.

Turning to FIG. 2, details of the receive controller/translator 300 are seen. Essentially, the controller/translator 300 includes a control sequencer block 310, which may be implemented in a ROM/register state machine or other means, a memory means 320 which is preferably implemented as a RAM, an address decoder 340 and accompanying registers 350, an address encoder 360 and accompanying registers 370, and two multiplexers 330 and 380.

The control sequencer 310 of the controller/translator 300 is the controller of the apparatus 10. Based on information received over lines 123 (RXB), 120 (RTIW), and data received over bus 112 (RB8-0), the control sequencer 310 issues a series of commands and effects the modification of the address fields of the incoming packet. In particular, and with additional reference to FIG. 3, and in accord with the method invention, initially all signals (other than the clock signal RCK provided to HDLC controller 100 by the control sequencer 310) are in their inactive states. When the HDLC controller 100 determines that it is starting to receive a packet (i.e., the first byte following a HDLC flag character has been detected), the HDLC controller 100 activates its receive busy signal RXB; i.e., line 123 is brought low. In response, at the next byte clock, the control sequencer 310 activates lines RENA 115 and RECRS 114. The RENA signal enables the HDLC controller 100 to output received bytes onto the data bus 112, while RECRS resets the internal error checking mechanism of the HDLC controller 100 as will be discussed in more detail hereinafter. While the RENA signal is active, not only will the data received by the HDLC controller 100 be output onto data bus 112, but the HDLC controller 100 will activate line RTOW 121. With RTOW 121 active, the data being output onto the data bus 112 will be written into registers 350 under control of the control sequencer 310 and will not be written into FIFO 500. The control sequencer 310 counts the number of incoming RTOW pulses received. After the requisite number of bytes (octets) have been entered into the registers 350, the control sequencer 310 takes lines RENA and RECRS inactive. The receive controller/translator 300 then conducts the address modification operation as discussed hereinafter. During address modification, bytes that are received by the HDLC controller 100 are buffered in a memory internal to the HDLC controller.

As shown in FIG. 2, the writing of data into registers 350 is accomplished by control sequencer 310 enabling the register (at the load control LD of the register) which is to receive the data. The enabled register receives data at the data input port (DI) of the register. While three registers are shown in FIG. 2, it will be appreciated that two, three, four, or a greater number of registers can be utilized as desired.

In order to effect address modification, upon the requisite number of registers 350 being loaded with address information, address decoder 340 utilizes those bits of the address field which constitute the DLCI. As discussed above, with reference to the draft ANSI standards, the DLCI code comprises, at a minimum, the first six bits of the first address field octet, and the first four bits of the next address field octet. Where a third octet is utilized in the address field (and a fourth octet is not used), the first six bits of the third octet are used as part of the DLCI code. However, where the fourth octet is used in the address field, the first seven bits of the third octet, and the first six bits of the fourth octet are used as part of the DLCI code. Thus, either ten, sixteen, or twenty-three bits may be used to comprise the DLCI address. In order to determine whether the field address utilizes bits from two, three or four octets, the ANSI standard field octet where bits from the next address field octet are to be included in the DLCI address. Conversely, the presence of a one in the LSB of any address field octet is used to indicate that the address field octet containing the one in the LSB is the final octet of the address field.

If the DLCI address is fixed at ten, sixteen, or twenty-three bits, then the address decoder 340 simply may comprise a register with lines coupled to the locations in registers 350 which hold the DLCI address. If, however, the DLCI address can vary, the address decoder 340 must include additional circuitry, including: logic gates to look at the LSB of the second and third octets held in registers 350; and switches to accept or reject bits from the third or fourth registers, including a switch to accept or reject the seventh bit of the third register depending on the value of the LSB of the third register. It will be appreciated that the registers 350 may be physically located in the address decoder 340, if desired.

Once the bits of the DLCI address are clocked into the address decoder 340, the DLCI address is used to address RAM 320. RAM 320 is programmed as a translation table between incoming and outgoing DLCI addresses by providing at RAM addresses corresponding to the incoming DLCI addresses corresponding outgoing DLCI addresses. For example, if an incoming address of "0110001011" is to be changed to an outgoing address of "0101001110", then the value "0101001110" is programmed into address 0110001011 of the RAM. As indicated in FIGS. 2 and 3, programming of the RAM 320 is accomplished by microprocessor 390 which typically receives the programming information from a network manager. As the details regarding the manner in which the network manager determines what the translation table should be are unimportant to the instant invention, no more discussion is necessary regarding the same. It should suffice to note, that in programming the RAM, the microprocessor 390 sends data to the RAM over data bus 392 while pulsing RAM write command line 393. The RAM address to which the data is written is sent on address bus 394 via multiplexer 330 which is controlled by the control sequencer 310. The control sequencer 310 controls multiplexer 330 in response to the write command signal placed by the microprocessor 390 on bus 393 which is also received by the control sequencer 310.

When RAM 320 is not being programmed, the address received at its address port (ADDR) via multiplexer 330 is the address provided by the address decoder 340. The data contained at the address is output at the data output (DO) and received by address encoder 360. The function of address encoder 360 is essentially the converse of the function of address decoder 340; i.e., the ten, sixteen, or twenty-three bit address received from RAM is divided into two, three, or four sections, and forwarded to registers 370 (only three being shown). If desired, additional zeros and ones (bits) can be added by the address encoder 360 to the DLCI bits provided by the RAM 320 to form desired octets. Typically, the added bits will be the same as the bits removed during the transfer of information from registers 350 to address decoder 340. Alternatively, the additional bits required to form octets can be added by the control sequencer 310 to registers 370.

With the modified address field octets properly located in registers 370, as seen in FIG. 3, the control sequencer 310 brings the REXT signal active (low) to permit the bytes (octets) to be written onto the data bus 112. Bytes are written onto the data bus under control of the control sequencer 310 which controls multiplexer 380 such that address field bytes are taken in a proper sequential fashion from the registers 370 (which may be located in the address encoder 360 if desired). The bytes written onto the data bus are read by HDLC controller 100 as the control sequencer 310 causes an active RTIW signal to accompany the active REXT signal. Having the bytes written to the HDLC controller 100 permits the HDLC controller to calculate a checksum for an internal error check over the modified address bytes. At the same time the HDLC controller 100 is receiving the bytes, the bytes are being written into FIFO 500, as the active RTIW signal received by the HDLC controller 100 causes the HDLC controller 100 to output one FIFO write pulse, ROW, on line 119 for each RTIW pulse it sees with REXT active. With each write pulse ROW which pulses port 124 of FIFO 500 and enables the FIFO, an address field byte taken from registers 370 and placed on data bus 112 (RB8-0) is received by FIFO 500.

After the modified address is written into FIFO 500, it will be appreciated that signals ROW 119 and RENA 115 are kept active to permit the HDLC controller 100 to forward the remainder of the packet (at least some of which has been stored in memory internal to the HDLC controller) to the FIFO 500. In fact, where internal error check bytes are provided by the HDLC controller 100, the ROW of the packet. After the internal error check bytes are provided, RXB is brought inactive by the HDLC controller 100, and in response, RENA is brought inactive by the control sequencer 310.

The preferred internal error checking mechanism provided by the HDLC controller 100 is to append to the modified packet a two-byte trailer to be used only internally and not transmitted. The contents of the first byte is the longitudinal checksum of the modified packet; i.e., bit 1 is the modulo-2 sum of bit 1 of all bytes of the packet, etc. The second byte is the ones compliment (inverse) of the first byte. This mechanism allows the detection of various system faults, including stuck-at-one or stuck-at-zero faults.

It will be appreciated by those skilled in the art that the depth of FIFO 500 will depend primarily on output considerations from the apparatus of the invention. Likewise, the storage required in the HDLC controller 100 may be dictated by external considerations, as the delay introduced by the address field modification system will be on the order of a few bytes only. Even with sufficient FIFO depth and HDLC controller storage, however, it is possible that either the FIFO 500 or the HDLC controller storage can overflow. Hence, control lines are provided to account for these situations. In particular, when the FIFO 500 is full, a FIFO full signal (RFF) is placed by FIFO 500 on line 117. As long as the RFF signal is active, the HDLC controller 100 will not bring its ROW signal active. Similarly, when the internal storage or FIFO of the HDLC controller overflows, the HDLC controller 100 provides an overflow condition signal (ROVF) to the control sequencer 310 via line 118. The overflow condition signal permits the control sequencer to recognize that an error event has occurred. Recovery from the error event is obtained by aborting the packet currently being received. Preferably, this is done by issuing a reset signal (RSS).

After an error signal, or upon start-up, the control sequencer 310 sends a reset signal (RRS) to the HDLC controller 310 and the FIFO 500 over line 122. This causes the HDLC controller 100 and FIFO 500 to clear all data held internally.

There have been described and illustrated herein apparatus and methods for the high speed modification of address fields of a transmitted packet in a frame relay system. While particular embodiments of the invention have been described, it is not intended that the invention be limited thereby, as it is intended that the invention be as broad in scope as the art will allow. Thus, it is understood by those skilled in the art that while particular circuitry has been set forth, other equivalent circuits could be utilized. For example, instead of using a FIFO at the output, registers or other types of memory can be utilized. In such a situation, it may be unnecessary for the HDLC controller 100 to include internal memory for storing packet bytes, as the incoming data may be sent directly to the output memory and stored. When the modified address field bytes are available, they can then be sent to locations in the output memory, and via the use of multiplexers or other selection means, the outgoing data can be sent in its proper order. It will also be appreciated that while the HDLC controller 100 was described as including an internal error checking mechanism no such mechanism need be provided. Where the HDLC controller 100 does not include an internal error checking mechanism there is no reason to read the modified address field bytes from the receive controller/translator back to the HDLC controller. Further, it will be appreciated that control sequencer is utilized to provide flexibility to the system. For example, if desired, the number of bytes being read into decoder registers 350 need not correspond to the number of bytes generated at the address encoder 360. In particular, at times it might be desirable to create an output header which has more bytes than the incoming header. This may be accomplished by causing the control sequencer to address the RAM sequentially to provide several outputs from the RAM in response to the DLCI address provided by the address decoder. On the other hand, where flexibility is not required or desired, the control sequencer can be eliminated from the circuit completely. In order to eliminate the control sequencer, a second data bus could be provided for coupling the HDLC controller and the address decoder registers. Upon determining that a packet is being received, the HDLC controller would forward a st number of bytes (e.g., four bytes) in a sequential fashion to the decoder registers via the second data bus. Based on the LSB's of the bytes, the address decoder would provide the incoming DLCI address to the RAM which would output the outgoing DLCI address to the address encoder. In turn, the address encoder would output the header bytes onto the first data bus which would provide the bytes to the FIFO. By guaranteeing that the HDLC controller delay the packet data by enough time to permit the DLCI translation to occur (say, two bytes) and to permit forwarding to the FIFO, no conflict on the first data bus would occur, and the buffered bytes of the packet, (as well as the remainder of the packet when received) could then be forwarded to the FIFO.

An alternative approach to eliminating the control sequencer is to utilize the same bus structure as with the control sequencer, but to provide some of the control sequencer functions in the HDLC controller. For example, the HDLC controller could provide strobe controls such that data placed on the bus will be written to the address decoder rather than the FIFO. Likewise, a predetermined length of time after the address field bytes have been written to the address decoder, the HDLC controller could cause the data to be written from the address encoder to the FIFO.

Those skilled in the art will further appreciate that while a RAM is shown to be dedicated to a single HDLC controller and control sequencer, it is possible to utilize a single RAM for a plurality of HDLC controller and control sequencers. While the sharing of the RAM might nominally slow down the address translation for any given system, the cost savings can be significant. Also, those skilled in the art will appreciate that while the address provided by the address decoder for addressing the RAM can be an actual address of the RAM, it can also relate to a RAM address (e.g., the address provided by the address decoder may be truncated by deleting bits, or bits may be added as required). Therefore, it will be appreciated by those skilled in the art that yet other modifications could be made to the provided invention without deviating from its spirit and scope as so claimed.

I claim:

1. Apparatus in a frame relay system for modifying the address field bytes of an incoming packet containing additional data bytes, comprising:
    (a) interface means for determining that said incoming packet is being received and for receiving said incoming packet, and for sending a control signal indicating that said incoming packet is being received;
    (b) control sequencer means coupled to said interface means for receiving said control signal;
    (c) address decoder means coupled said interface means for receiving said address field bytes from said interface means and for determining a DLCI address therefrom;
    (d) a first memory means coupled to said address decoder, said first memory means comprising a translation table, wherein addresses of said first memory means relate to incoming DLCI addresses contained in said address field bytes of said incoming packet, and data contained at said addresses of said first memory means comprises outgoing DLCI addresses; and
    (e) address encoder means coupled to said first memory means for generating from said outgoing DLCI addresses a plurality of address field bytes of an outgoing packet, wherein said control sequencer means is coupled to said address decoder means and said address encoder means and controls the writing to said address decoder and reading from said address encoder after receiving said control signal, and said plurality of address field bytes of an outgoing packet are generated substantially within several byte clocks from the time a last of said address field bytes is received by said address decoder means from said interface means.

2. An apparatus according to claim 1, further comprising:
(f) second memory means coupled to said interface means, for receiving said additional data bytes from said interface means, and for receiving said plurality of address field bytes of an outgoing packet.

3. An apparatus according to claim 2, wherein:
said interface means comprises an HDLC controller which sends said control signal upon determining that other than an HDLC flag is being received, wherein said address field bytes are the first non-HDLC flag bytes of said packet.

4. An apparatus according to claim 2, wherein:
said address decoder means comprises a plurality of first registers for receiving said address field bytes of said incoming packet, and an address decoder for obtaining a plurality of bits of said address fields bytes from said first registers and generating therefrom an incoming DLCI address.

5. An apparatus according to claim 2, wherein:
said address encoder means comprises an address encoder for receiving said outgoing DLCI address and generating therefrom a plurality of outgoing address field bytes, and a plurality of second registers for receiving and holding said plurality of outgoing address field bytes.

6. An apparatus according to claim 2, wherein:
said first memory means comprises a data RAM.

7. An apparatus according to claim 2, wherein:
said interface means comprises an HDLC controller which sends said control signal upon determining that other than an HDLC flag is being received, wherein said address field bytes are the first non-HDLC flag bytes of said packet;
said address decoder means comprises a plurality of first registers for receiving said address field bytes of said incoming packet, and an address decoder for obtaining a plurality of bits of said address fields bytes from said first registers and generating therefrom an incoming DLCI address;
said address encoder means comprises an address encoder for receiving said outgoing DLCI address and generating therefrom a plurality of outgoing address field bytes, and a plurality of second registers for receiving and holding said plurality of outgoing address field bytes; and
said first memory means comprises a data RAM.

8. An apparatus according to claim 7, wherein:
said second memory means comprises a FIFO means.

9. An apparatus according to claim 2, further comprising:
(g) a byte wide data bus coupling said interface means, said control sequencer means, and said second memory means, said byte wide data bus for carrying said incoming address field bytes from said interface means to said address decoder, for carrying said outgoing address field bytes to said second memory means, and for carrying said additional data bytes of said packet from said interface means to said second memory means.

10. An apparatus according to claim 7, further comprising:
(g) a byte wide data bus coupling said interface means, said control sequencer means, and said second memory means, said byte wide data bus for carrying said incoming address field bytes from said interface means to said address decoder, for carrying said outgoing address field bytes to said second memory means, and for carrying said additional data bytes of said packet from said interface means to said second memory means, wherein
said second memory means comprises a FIFO means.

11. An apparatus according to claim 9, wherein:
said control sequencer includes means for providing at least one control signal to said interface means at desired times, said at least one control signal comprising,
a first control signal (RENA) which enables said interface means to output a byte of data onto said byte wide data bus.

12. An apparatus according to claim 11, wherein:
said at least one control signal further comprises,
a second control signal (REXT) which enables said interface means to read into said interface means a byte of data on said byte wide data bus, and
a third control signal (RTIW) which strobes said interface means to cause said interface means to read said byte wide data bus,
wherein said control sequencer provides said first, second, and third control signals at desired times in a desired order.

13. An apparatus according to claim 11, wherein:
said interface means includes means for outputting additional control signals, including
a fourth control signal (RTOW) which strobes said control sequencer to cause said control sequencer to cause said address decoder means to read data sent by said interface means onto said byte wide data bus, said fourth control signal being sent while said first control signal (RENA) is active.

14. An apparatus according to claim 12, wherein:
said interface means includes means for outputting additional control signals, including
a fourth control signal (RTOW) which strobes said control sequencer to cause said control sequencer to cause said address decoder means to read data sent by said interface means onto said byte wide data bus, said fourth control signal being sent while said first control signal (RENA) is active, and
a fifth control signal (ROW) which strobes said second memory means to cause said second memory means to read data on said byte wide data bus, said fifth control signal being sent in response to said third control signal.

15. Apparatus in a frame relay system for modifying the address field bytes of an incoming packet containing additional data bytes, comprising:
(a) interface means for determining that said incoming packet is being received and for receiving said incoming packet;
(b) address decoder means coupled to said interface means for receiving said address field bytes from said interface means and for determining a DLCI address therefrom;

(c) a first memory means coupled to said address decoder, said first memory means comprising a translation table. wherein addresses of said first memory means relate to incoming DLCI addresses contained in said address field bytes of said incoming packet, and data contained at said addresses of said first memory means comprises outgoing DLCI addresses;

(d) address encoder means coupled to said first memory means for generating from said outgoing DLCI addresses a plurality of address field bytes of an outgoing packet;

(e) second memory means coupled to said address encoder means and said interface means, for receiving said additional data bytes from said interface means, and for receiving said plurality of address field bytes of an outgoing packet; and (f) at least one data bus over which said address field bytes are transported from said interface means to said address decoder means, said address field bytes of an outgoing packet are transported from said address encoder means to said second memory means, and said additional data bytes are transported from said interface means to said second memory means, wherein said plurality of address field bytes of said outgoing packet are generated substantially within several byte clocks from the time a last of said address field bytes is received by said address decoder means from said interface means.

16. An apparatus according to claim 15, wherein:
said interface means comprises an HDLC controller which identifies said address field bytes as the first non-HDLC flag bytes of said packet.

17. An apparatus according to claim 16, wherein:
said address decoder means comprises a plurality of first registers for receiving said address field bytes of said incoming packet, and an address decoder for obtaining a plurality of bits of said address fields bytes from said first registers and generating therefrom an incoming DLCI address, and
said address encoder means comprises an address encoder for receiving said outgoing DLCI address and generating therefrom a plurality of outgoing address field bytes, and a plurality of second registers for receiving and holding said plurality of outgoing address field bytes.

18. An apparatus according to claim 17, wherein:
said first memory means comprises a data RAM, and said second memory means comprises a FIFO means.

19. A method for modifying the address field bytes of an incoming packet containing additional data bytes, said method utilizing an apparatus comprising an interface means, an address decoder, and first and second memory means, said method comprising:

(a) with said interface means, identifying receipt of said (b) upon receipt of said incoming packet, sending said address field bytes of said incoming packet to said address decoder means;

(c) with said address decoder means, determining a DLCI address from said address field bytes;

(d) using an address related to said determined DLCI address to address said first memory means, wherein said first memory means comprises a translation table with data contained at addresses related to incoming DLCI addresses of said first memory means comprising outgoing DLCI addresses;

(e) sending the outgoing DLCI address from the first memory means to said address encoder means, and generating from said outgoing DLCI address a plurality of address field bytes of an outgoing packet; and (f) forwarding said address field bytes to said second memory means for inclusion as the outgoing address field of said outgoing packet, wherein said steps (c) through (f) are accomplished substantially within several byte clocks of said apparatus and while said interface means is receiving said additional data bytes.

20. A method according to claim 19, wherein:
said apparatus further includes a sequence controller means, and said method further comprises,
after said interface means identifies receipt of an incoming packet, sending a first control signal (RXB) from said interface means to said sequence controller means; and
sending a second control signal (RENA) from said sequence controller means to said interface means in response to said first control signal, thereby causing said address field bytes to be sent to said address decoder means.

21. A method according to claim 20, further comprising:
after said plurality of outgoing address field bytes are generated, sending at least one third control signal from said sequence controller means to cause said address field bytes to be forwarded to said second memory.

22. A method according to claim 21, wherein:
said at least one third control signal comprises a first data write control signal sent from said sequence controller means to said interface means, and a second data write control signal sent from said interface means to said second memory means in response to said first data write control signal.

23. A method according to claim 19, further comprising:
storing at least one of said additional data bytes in said interface means during steps (c)–(f); and
sending said at least one stored additional data byte to said second memory means after said address field bytes are sent to said second memory means.

* * * * *